(No Model.) 8 Sheets—Sheet 1.
H. COOK.
CASH REGISTER AND INDICATOR.
No. 503,946. Patented Aug. 29, 1893.
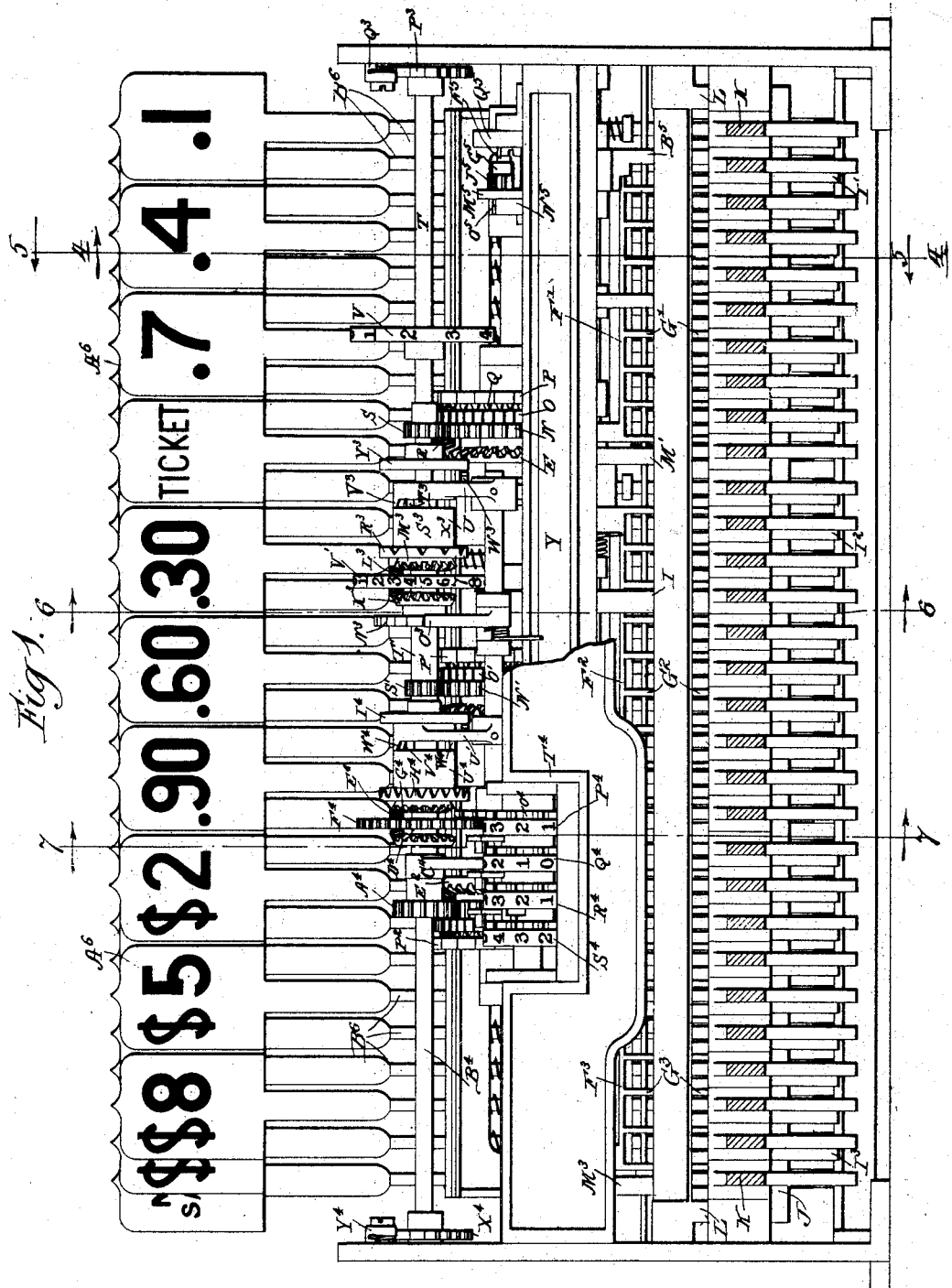
Witnesses
Wm. F. Henning
Wm. M. Rheem
Inventor
Hugo Cook
by Edward Rector
his Attorney.

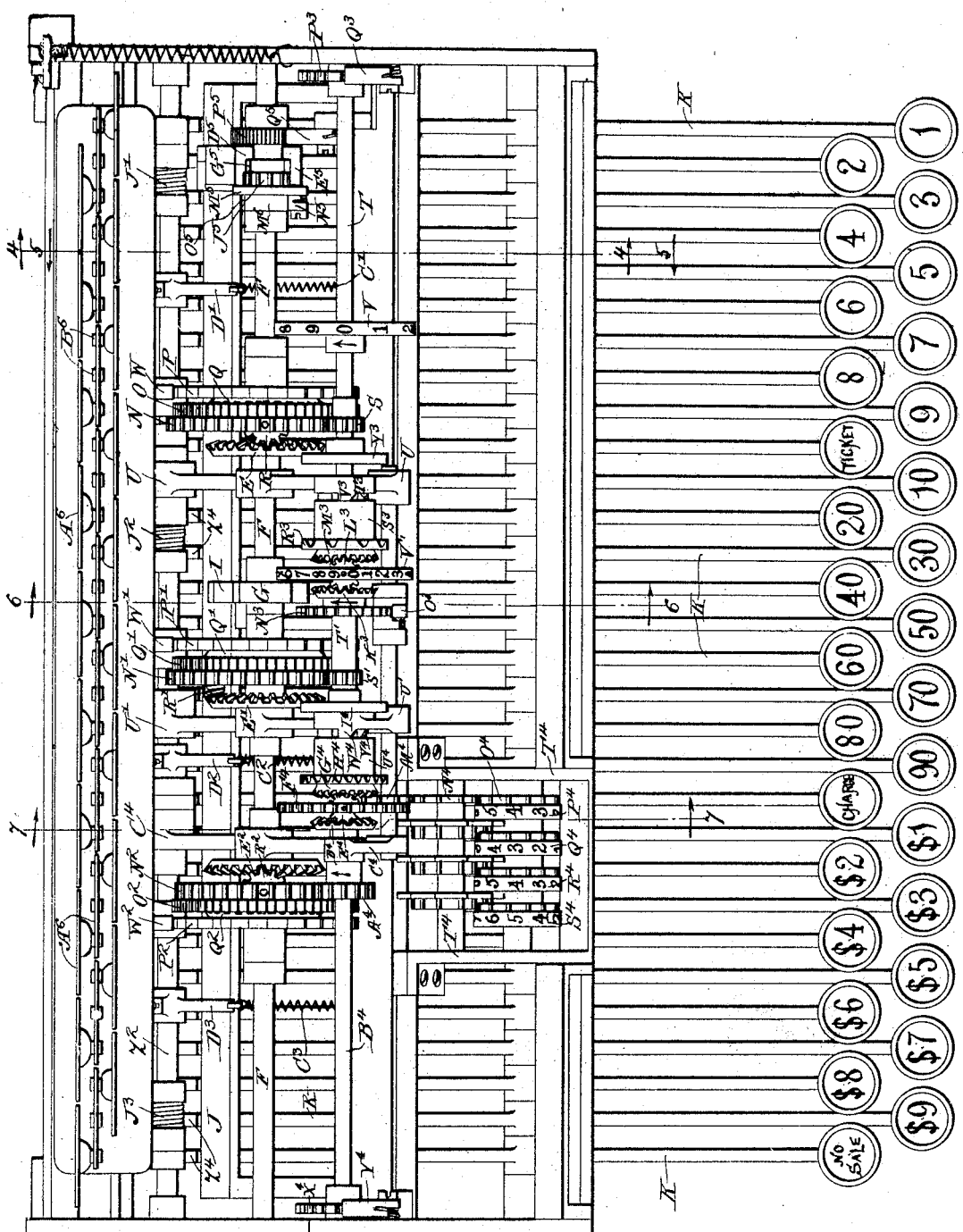

(No Model.)  8 Sheets—Sheet 3.
H. COOK.
CASH REGISTER AND INDICATOR.
No. 503,946.  Patented Aug. 29, 1893.
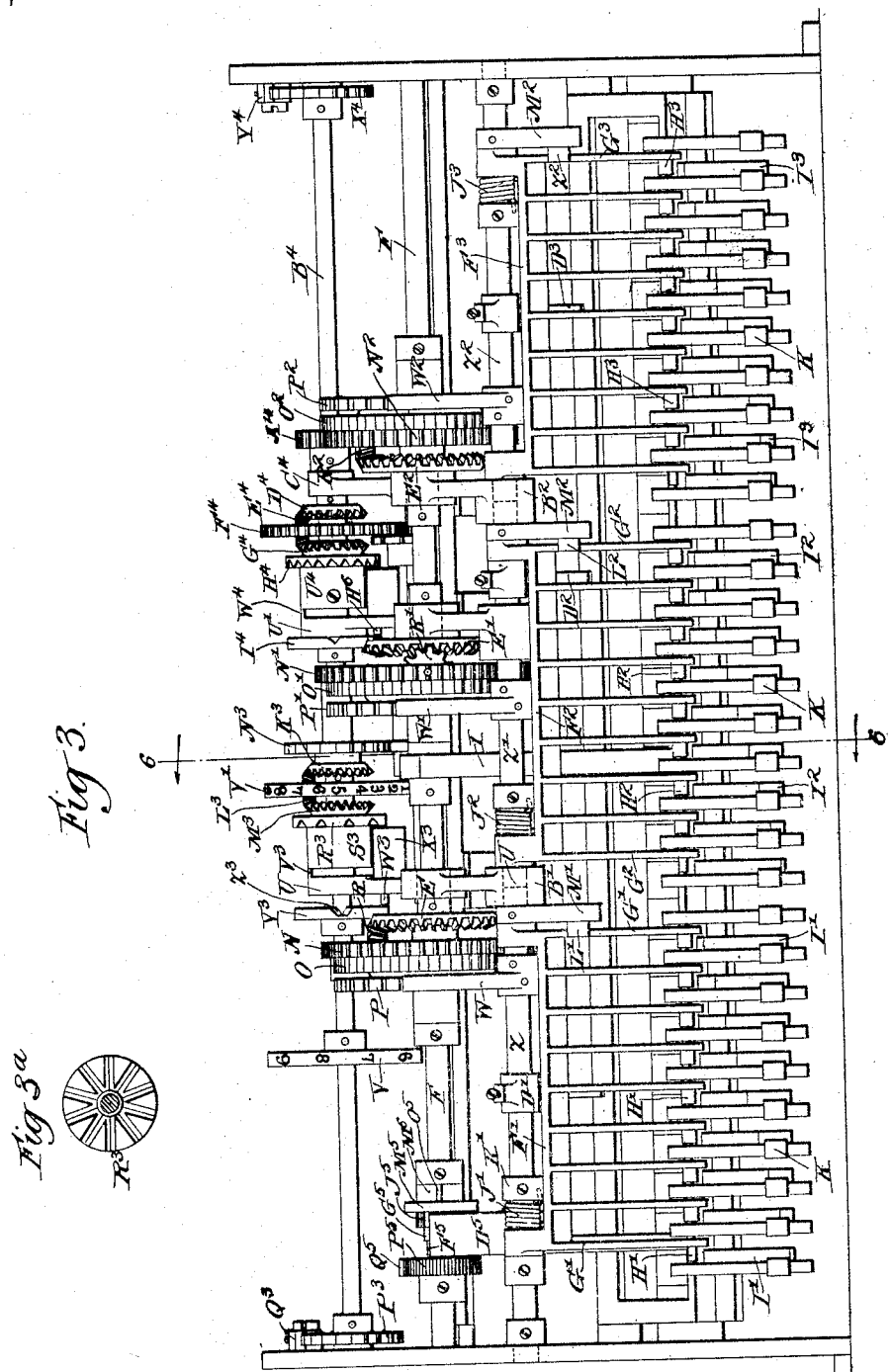
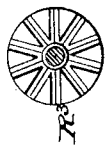
Witnesses
Inventor
Hugo Cook
by Edward Rector
his Attorney.

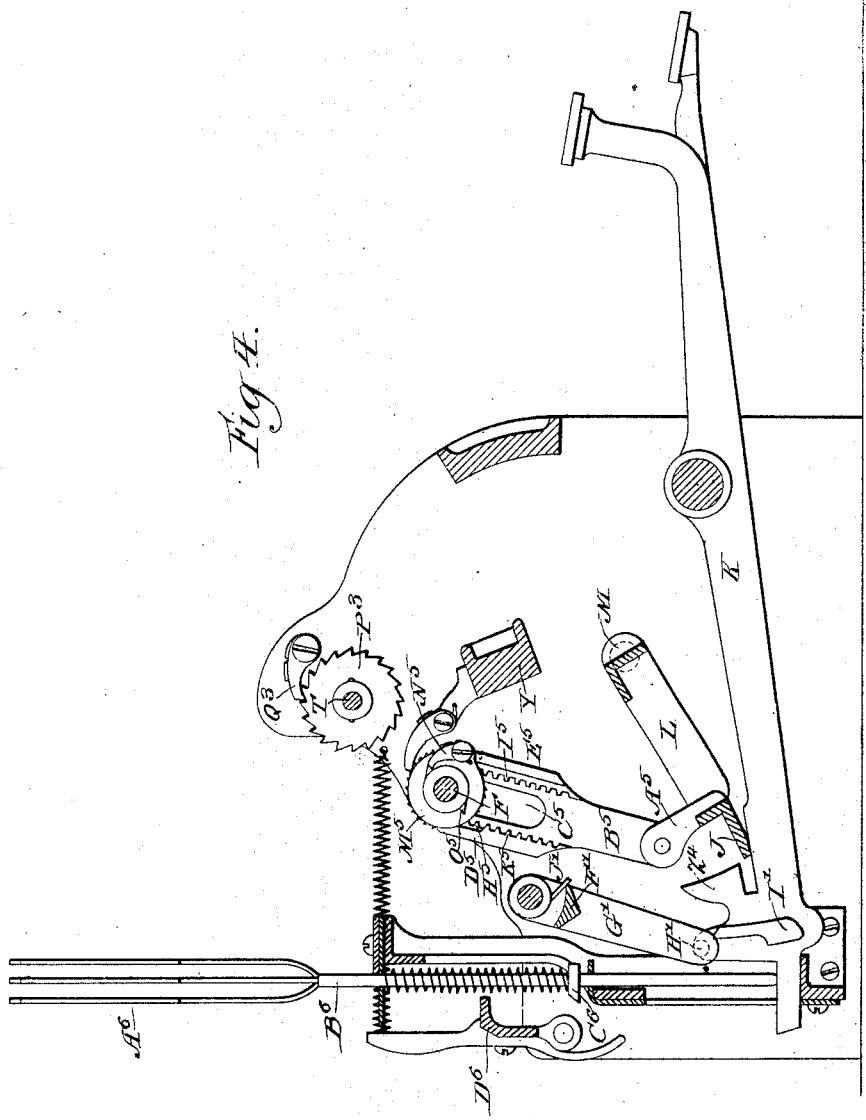

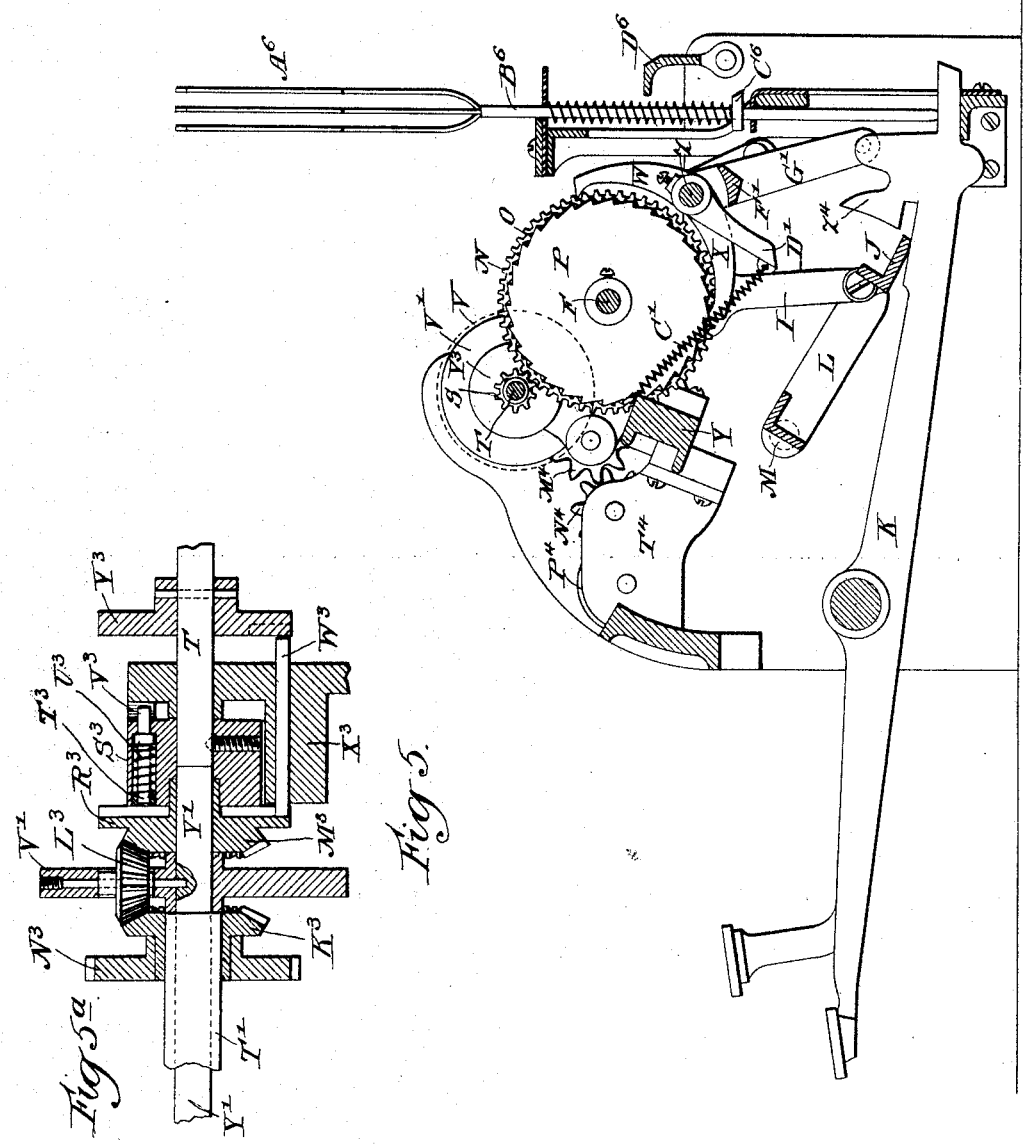

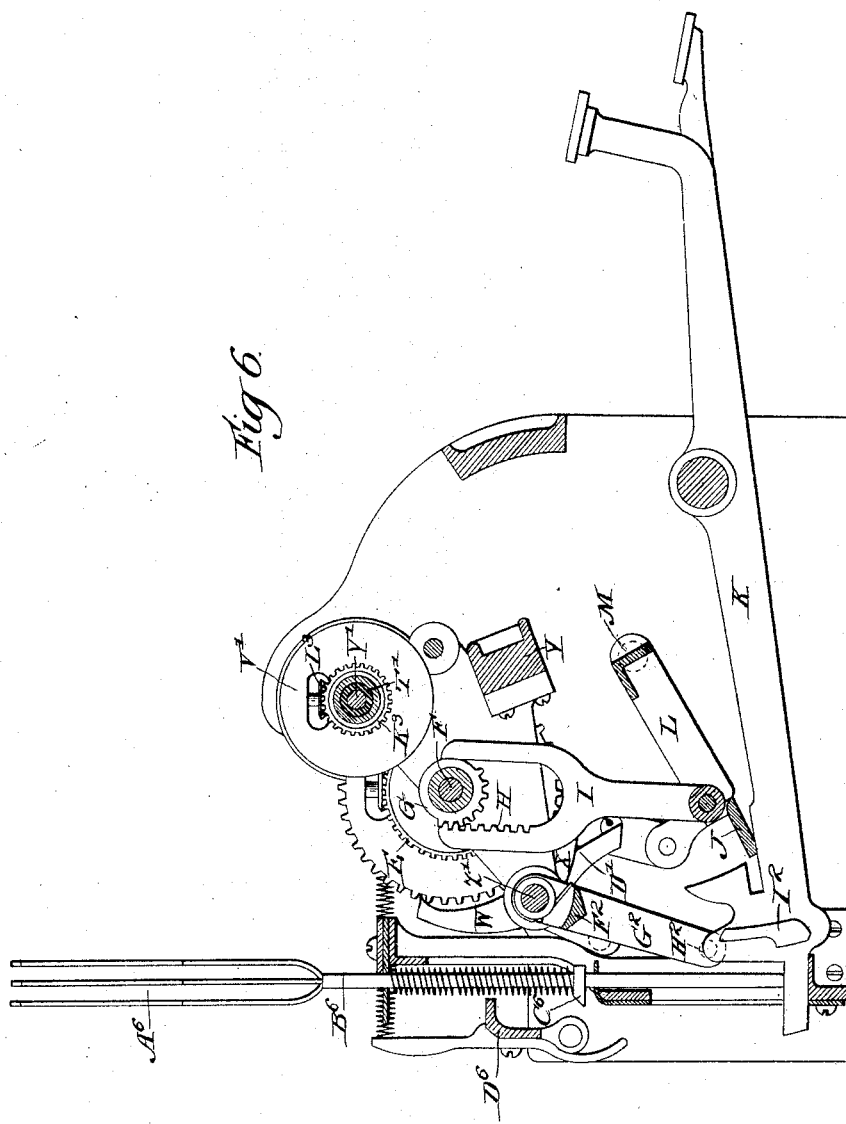

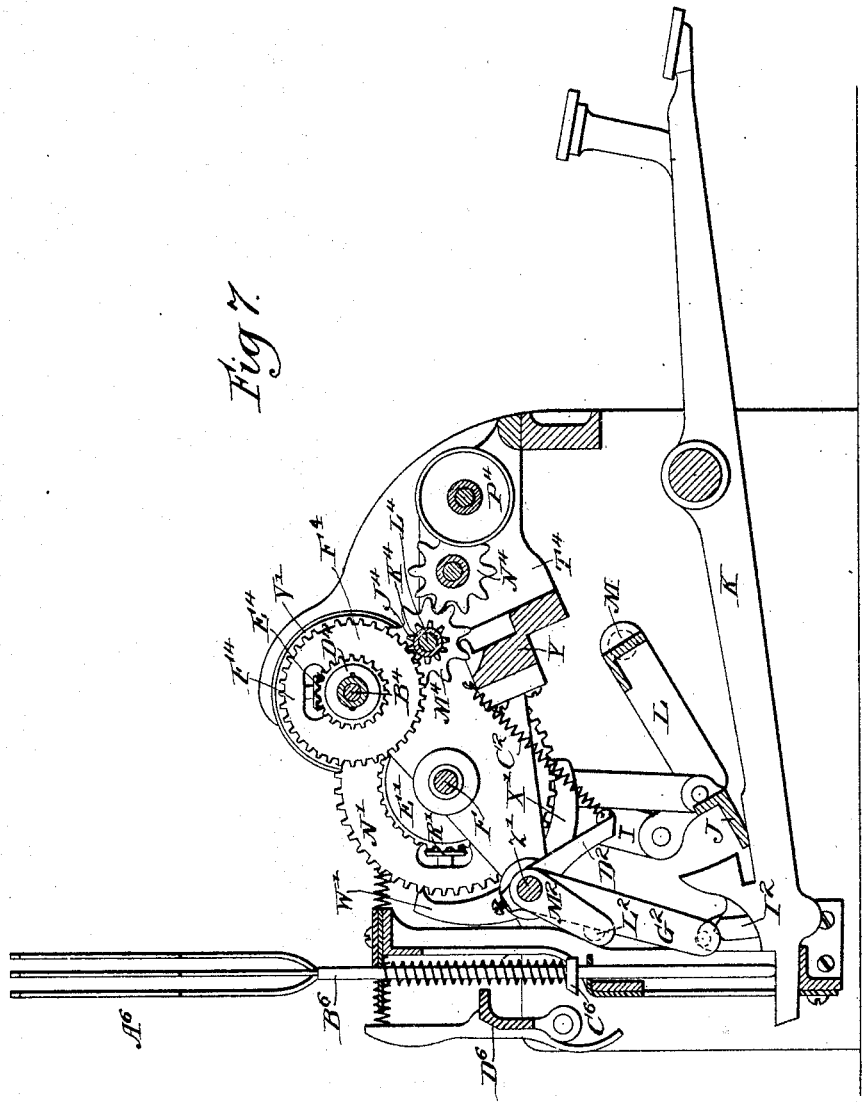

(No Model.) 8 Sheets—Sheet 8.
H. COOK.
CASH REGISTER AND INDICATOR.
No. 503,946. Patented Aug. 29, 1893.
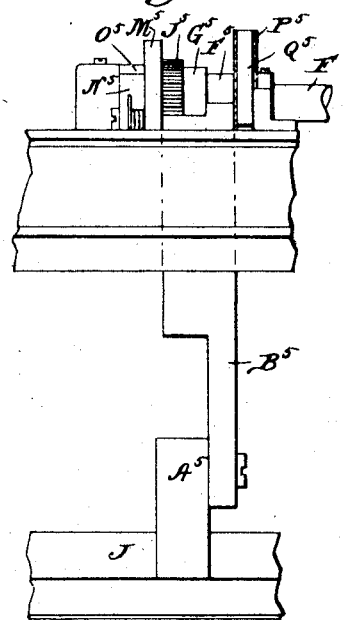
Fig. 8.
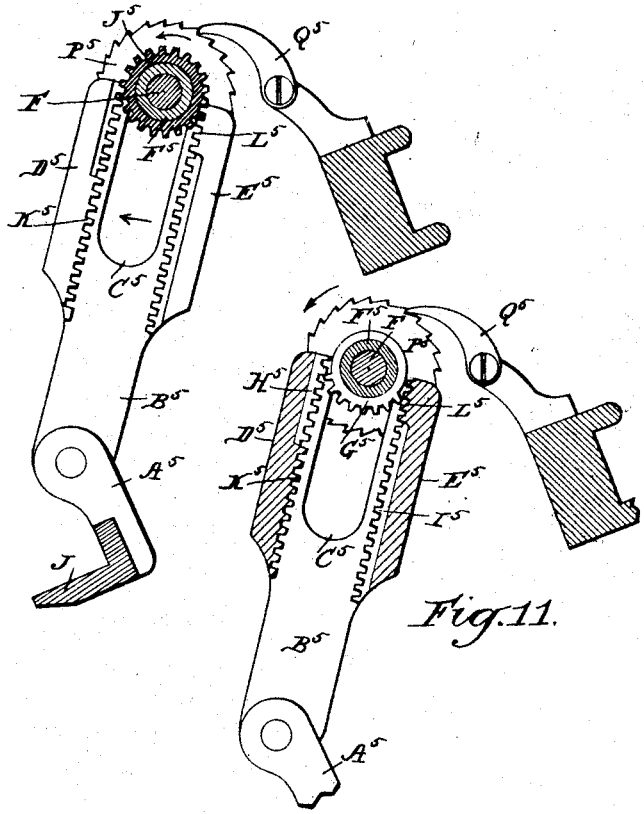
Fig. 9.
Fig. 11.
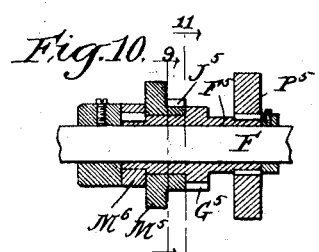
Fig. 10.
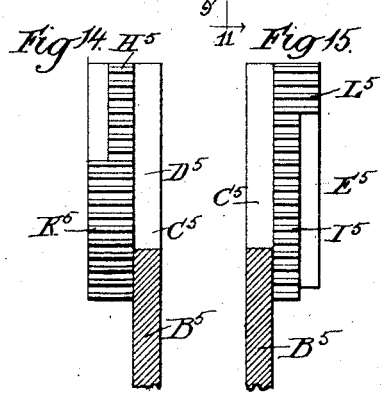
Fig. 14. Fig. 15.
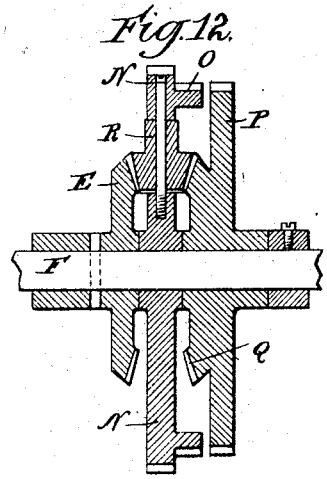
Fig. 12.
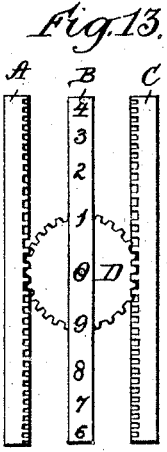
Fig. 13.
Witnesses
Wm. F. Fleming
Wm. N. Rheem
Inventor
Hugo Cook
by Edward Rector
his Attorney.

UNITED STATES PATENT OFFICE.

HUGO COOK, OF DAYTON, OHIO.

CASH REGISTER AND INDICATOR.

SPECIFICATION forming part of Letters Patent No. 503,946, dated August 29, 1893.

Application filed November 19, 1892. Serial No. 452,569. (No model.)

*To all whom it may concern:*

Be it known that I, HUGO COOK, a citizen of the United States, residing at Dayton, in the county of Montgomery and State of Ohio, have invented a certain new and useful Improvement in Cash-Registers, of which the following is a description, reference being had to the accompanying drawings, forming part of this specification.

My invention consists primarily in a new mechanical movement, and in its adaptation to and combination in a cash register or analogous registering machine.

Its novelty consists in such mechanical movement, and in the new constructions, combinations and modes of operation of the various parts, all as will be hereinafter set forth and particularly pointed out in the claims.

In the accompanying drawings, in all of which the machine is shown removed from its casing, Figure 1 represents a front elevation of the machine, with the front ends of the operating keys cut off and with part of the framework broken away to expose parts behind it; Fig. 2 a top plan view of the machine; Fig. 3 a rear elevation of the machine with the tablet rods, the supporting bar or wing therefor, and the slotted guide-plates for the rear ends of the keys, all removed, to expose the parts beyond; Fig. 3ª a detail view of a notched disk of the transfer mechanism; Fig. 4 a vertical section of the machine on the line 4—4 of Fig. 1, looking toward the right; Fig. 5 a vertical section upon the same line, looking toward the left, with the primary registering wheel shown only in dotted lines, in order to expose the parts beyond; Fig. 5ª a sectional detail of part of the transfer mechanism; Figs. 6 and 7 vertical sections on the lines 6—6 and 7—7 of Fig. 1, looking toward the right; Figs. 8, 9, 10 and 11 enlarged detail views of the key arresting or full stroke mechanism; Fig. 12 an enlarged vertical section of the three wheels and interposed pinion forming part of my new mechanical movement; Fig. 13 a hypothetical detail view explanatory of said mechanical movement; and Figs. 14 and 15 details of the racks forming part of the motion-converting and full stroke mechanisms.

The same letters of reference are used to indicate identical parts in all the figures.

The underlying principle of my invention is embodied in a new mechanical movement, which may be said to consist of a driving member, a driven member, a revoluble wheel or equivalent member, (which may be the primary registering wheel itself or the part through which movement is transmitted to the registering wheel or wheels,) a pinion or other connecting member carried by the revoluble wheel and geared to or otherwise arranged in driving connection with the driving and driven members, and means for alternately locking and releasing the driven member and the revoluble wheel for the purpose of imparting to said wheel different portions of the movement of the driving member.

In the embodiment of my invention illustrated in the drawings and hereinafter described in detail the driving and driven members consist of gear wheels with which mesh a pinion carried by the revoluble member or wheel. When the revoluble wheel is permitted to turn and the driven gear is locked the movement of the driving gear causes the pinion carried by the revoluble wheel to travel upon the driven gear as a fixed rack and advance the revoluble wheel, and when the revoluble wheel is locked and the driven gear is released the axis of the pinion is held in a fixed position and the continued revolution of the pinion imparted by the driving gear caused to turn the driven gear, while the revoluble wheel remains stationary. By simultaneously locking the revoluble wheel and releasing the driven gear, (or vice versa,) at different points in the movement of the driving gear different degrees of movement will be imparted by the latter to the revoluble wheel, and consequently to any registering wheel or train of wheels geared to or otherwise actuated by said revoluble wheel.

In the embodiment of the invention in a cash register or analogous machine the means for locking and releasing the wheel and gear may be arranged to co-operate with the operating keys in such manner that the point at which the wheel will be locked and the gear released, or vice versa, may be determined by the particular key operated, and in this manner the driving gear, under the operations of different keys, be made to turn the revoluble wheel different degrees proportionate to the values of the respective keys.

Before describing the embodiment of my invention in a cash register, as illustrated in the drawings, I will endeavor to more clearly explain the mechanical movement itself by reference to the hypothetical view shown in Fig. 13. In that view the gear wheel A may be taken to be the driving member, having a definite movement in the direction of the arrow at each operation of the machine; B the revoluble member or wheel and C the driven member, both loose upon the same axis as the gear wheel A. The wheel B has journaled in it, upon an axis perpendicular to its own, a pinion D which meshes with the gear wheels A and C. Under this construction and arrangement it will be seen that if the wheel C be held stationary and the wheel B left free to turn the movement of the wheel A in the direction of the arrow will cause the pinion D to travel along the gear wheel C as a fixed rack and turn the wheel B forward, the latter being advanced at half the speed of the wheel A. If before the movement of the wheel A is completed the wheel C be released and the wheel B locked the further movement of the wheel A in the direction of the arrow will cause the pinion D to turn upon a fixed axis and carry the wheel C rearward in the direction of the arrow beside it. In this manner at each forward movement of the wheel A the wheel B may be turned forward any desired distance within the limit of movement which the wheel A is capable of giving it, the distance which it is turned at each operation being determined by the point in the forward movement of the wheel A at which the wheel C is released and the wheel B locked.

Under the operation just described the wheel B is turned forward during the first part of the movement of the wheel A and held stationary during the latter part of its movement, but this operation may be reversed and the wheel B be held stationary at the beginning of the movement of the wheel A and turned forward by the latter part of said movement. Thus, if the wheel C be left normally free to turn and the wheel B be locked the first forward movement of the wheel A will turn the wheel C backward, and when the wheel C is locked and the wheel B released the latter will be turned forward by the continued movement of the wheel A.

Under either arrangement above described the wheel B may be the primary registering wheel or the driving wheel of a train of registering wheels. In the drawings I have assumed it to be divided into twenty equal spaces and shown it provided with two series of numbers, each from "0" to "9" inclusive. In such case the driving wheel A may be assumed to make a complete revolution in the direction of the arrow at each operation, and if the wheel C be held stationary during this entire revolution the wheel B would be turned forward a half revolution and register 10. If the wheel C were held stationary during nine-tenths of the revolution of the wheel A the wheel B would be turned forward nine-tenths of a half revolution and register 9. If it were held stationary during five-tenths of the revolution of the wheel A the wheel B would be turned forward a quarter of a revolution and register 5; if during three-tenths, the wheel B would be turned forward three-tenths of a half revolution, to register 3; and so on, as will be readily understood.

In the above explanation it has been assumed that the driving wheel A is revoluble, always turning in the same direction and moving forward a definite distance at each operation; but it is not essential that it be revoluble, for the desired result of advancing the registering wheel B varying distances at different operations may be accomplished by oscillating the wheel A forward and backward instead of revolving it. In such case, assuming the wheel C to be normally locked and the wheel B free to turn, the forward movement of the wheel A will advance the wheel B until the wheel C is released and the wheel B locked, whereupon the wheel C will be turned backward until the driver completes its forward movement. If the wheel B now remain locked during the entire backward movement of the wheel A the wheel C will then be turned forward the same distance that the wheel A turns backward. Thus, if the wheel A be turned forward and backward through a complete revolution at each operation the wheel C will, during the forward movement of the driver, be turned backward a distance determined by the point at which it was released and the wheel B locked, and will then be turned forward a full revolution by the backward movement of the wheel A. The operation may be reversed with an oscillatory driving member, just as with the revoluble driver before described, and the wheel B be advanced during the latter part of the forward movement of the driver instead of during the first part of said movement. Thus, the wheel C may be left normally free to turn and the wheel B be normally locked. At the forward movement of the wheel A the wheel C will be turned backward until it is locked and the wheel B released, whereupon the latter will be turned forward by the continued forward movement of the wheel A. Upon locking the wheel B and releasing the wheel C at the end of the forward movement of the wheel A the backward movement of the wheel A will turn the wheel C forward one revolution. Under this arrangement if the wheel B remains locked until the wheel A is turned forward three-tenths of its movement, and is then released and the wheel C locked, the balance of the forward movement of the wheel A will turn the wheel B forward seven points; if the wheel B remains locked until the wheel A has turned forward five-tenths of its movement the wheel B will then be turned forward five points; and so on, the distance which the wheel B is turned being determined by the point at which the wheel C becomes locked and the wheel B released.

In the illustration shown in Fig. 13 the revoluble member or wheel B of the movement is interposed between the driving member A and driven member C and the pinion D is journaled directly in the wheel B. This is the arrangement which I prefer to employ, but it is obvious that the wheel B might be located at either side of the wheels A and C and be provided with a laterally projecting arm or support extending across the peripheries of one or both of the wheels A and C and carrying the pinion D meshing with the gears of those wheels; or, the pinion might be journaled in a revoluble yoke or arch loosely mounted at its opposite ends upon the axis of the wheels A and C at opposite sides of the latter, and the registering wheels be geared to one of the hubs of such revoluble member or otherwise actuated by it.

Again, the principle and mode of operation of my invention might in some cases be utilized by the employment of a frictional driving connection instead of the geared one which I have illustrated and described. Thus, if the wheels A and C were simply flat friction disks and the wheel B had journaled in it a small friction wheel operating against the faces of the disks A and C, instead of the pinion D, the mode of operation above described might be carried out by alternately locking and releasing the wheel B and disk C during the movement of the driving disk A; as will be readily understood. The positive driving connection by gearing is preferable, and in the further description of my invention will be the only form of connection referred to, it being observed, however, that wherever it is desirable or practicable to substitute some other form of connection for the gearing, in utilizing the principle and mode of operation of my novel mechanical movement, such substitute or equivalent forms of connection are within the broader scope of my invention.

Again, in the foregoing description it has been assumed that the driving gear or other driving member of the mechanical movement be given a uniform movement at each operation, but this is not essential. It is only necessary that the driving member be given a sufficient movement at each operation, and the extent of this movement may vary. Thus, in Fig. 13, if it were desired to register 3 upon the wheel B, or a registering wheel driven by the wheel B, and the wheel C were locked and the wheel B free to turn at the beginning of the movement of the driving wheel A, the latter wheel need be turned forward only three-tenths of a revolution, to thereby turn the wheel B forward three-tenths of a half revolution and register 3 upon it. If the wheel B be locked and the wheel C be released when the driving wheel A has turned the wheel B the proper distance it is immaterial how much farther or in which direction the driving wheel A turns, since the only effect of its continued movement will be to turn the wheel C idly in one direction or the other. Of course if the driving wheel A were turned forward at each operation the exact distance necessary to register the desired amount upon the wheel B there would be no necessity for the wheels B, C and D, for the wheel A might in such case be the registering wheel; but the point which I wish distinctly understood is that it is not essential that the driving wheel be given a uniform movement at each operation, but only that it be given a sufficient movement and that the extent of its surplus movement after the registering wheel has been turned the desired distance is immaterial. Thus, if 3 is to be registered upon the wheel B, and the wheel B is locked and the wheel C released when the wheel B has been turned far enough for that purpose, it is immaterial whether the full movement given the driving wheel A be only three-tenths of a revolution, or be five-tenths or an entire revolution. Thus, in the embodiment of the movement in a registering machine, the driving wheel is conveniently actuated by a movable bar or frame common to all of the series of keys. Now, this movable frame may be given a uniform movement by the operations of the different keys, or it may be given a variable movement by the operations of different keys, it being only necessary that the frame be moved a sufficient distance by the operation of any given key to turn the driving wheel far enough to register the value of the key upon the registering wheel.

In the practical embodiments which I have made of my invention I have found it convenient to actuate the driving wheel by connection with a movable bar or frame common to all of the series of keys and given a uniform movement by the operations of different keys, but it is common in registering machines to employ a vibrating frame common to all of the series of keys and moved different degrees by the operations of different keys, and the driving wheel of my new mechanical movement may be actuated from such a frame as well as from a frame which is moved uniformly by the different keys. In such case the driving wheel would be turned a definite distance by the operation of each key, and not a uniform distance by the operations of different keys.

In the above explanation of the manner in which my invention may be employed where the driving member has a variable movement, I have assumed that the registering wheel was free and the driven member locked at the beginning of the movement, since such arrangement furnishes the simplest illustration of the modification referred to, but the parts may be so arranged and adjusted that the proper registrations may be effected where the registering wheel is given its movement during the latter part of the variable movements of the driving wheel, as well as where it is given its registering movement during the first part of such movements of the driving wheel, but a detailed description of such arrangement and adjustment is not deemed necessary here.

It will be understood that the sole duty of the pinion D is to form a driving connection between the three wheels, to cause the wheel A to turn the wheel B when the wheel C is held stationary, and to permit the wheel A to move independently of the wheel B when the latter is arrested and the wheel C released, and that any device which will perform this duty in the combination may be substituted for the pinion D. Thus, for instance, a short shaft might be journaled in the wheel B parallel with the axis of said wheel and have fast upon its opposite ends pinions meshing with internal or external gears upon the wheels A and C. Even where such a pinion as D is employed it is not essential that the same pinion should mesh with both the gear wheels, since the shaft upon which the pinion D is secured might have a second pinion fast upon it above or below the pinion D, one pinion meshing with the gear wheel A and the other with the gear wheel C, the two wheels in such instance being of unequal diameters to correspond to the positions of the pinions.

Having now explained the principle and mode of operation of my new mechanical movement I will proceed to describe its embodiment in a cash register or analogous machine: In the machine illustrated in the drawings the elements which I term the driving members or driving wheels, being the parts which correspond to the wheel A in the illustration above described, consists of beveled gears E E' E² fast upon a rock-shaft F journaled at its opposite ends in the side frames of the machine and intermediately in brackets upon the framework. In the machine illustrated there are employed three sets of operating keys, with a registering wheel appropriated to and actuated by each set of keys, and I employ one of my new mechanical movements for each registering wheel and set of keys. There are therefore three of the beveled driving gears fast upon the shaft F, and three sets of similar parts co-operating with the respective gears. The rock-shaft F has fast upon it near its middle a pinion, or segment of a pinion, G, Fig. 6, with which meshes a rack H formed upon the inner face of one of the arms of a yoke I pivoted at its lower end to the usual vibrating frame of the cash register, composed of the cross-bar J extending transversely across the entire series of key levers K and hung by side arms L at its opposite ends to the side frames of the machine at M. When the front end of any key lever is depressed this vibrating frame is lifted, lifting the yoke I with it and causing the rack H to turn the shaft F forward. When the operated key is released the resetting of the parts turns the shaft F backward to normal position. In this manner at each operation of any key the shaft F and all of the driving gears are given a definite forward and backward movement. The purpose of forming the rack H upon one arm of a yoke is simply to utilize the other arm of the yoke to hold the rack in engagement with the pinion. Instead of the yoke a simple rack bar pivoted to the vibrating frame and held in engagement with a pinion upon the shaft F by any suitable means might be employed.

Inasmuch as the devices associated and co-operating with each driving gear and corresponding set of keys are substantially the same as those for the other driving gears and sets of keys, I will first describe those associated with the right hand set of keys and right hand driving gear E. Loosely mounted upon the shaft at the right of the gear E, Fig. 2, is a wheel N, in this instance having gear teeth upon its periphery and a toothed ring or ratchet O upon its side. At the right of the wheel N is a second wheel P, in this instance having a toothed periphery, and also having fast upon its left hand side, adjacent to the wheel N, a circular beveled rack Q, of the same size and co-incident with the driving gear E, as seen most clearly in Fig. 12. Mounted in an opening in the wheel N, upon an axis perpendicular to the shaft F, is a beveled pinion R meshing at one side with the driving gear E and at its opposite side with the rack Q upon the wheel P. The gear wheel N, Fig. 2, meshes with a pinion S fast upon a revoluble shaft T journaled at its right hand end in a bearing upon the side frame of the machine, and near its left hand end in a bracket U upon the framework, and having fast upon it the primary registering wheel V, which bears upon its periphery ten equidistant numbers from 0 to 9 inclusive. Under this arrangement of the parts it will be seen that if the wheel N be held stationary at the beginning of the forward movement of the driving gear E and the wheel P left free to turn, the latter will be turned rearward, and if the wheel N be released and the wheel P locked before the forward movement of the driving gear E is completed the wheel N will then be turned forward a distance determined by the point at which it was released and the wheel P locked, and in so turning forward will turn the pinion S, shaft T and wheel V backward and effect the registration upon the latter. Upon the return backward movement of the driving gear E the wheel P will be turned forward the full distance which the driver is capable of moving it, while the wheel N and registering wheel V remain stationary at the point to which they have been turned by the forward movement of the driving gear E. The sole purpose of the toothed wheel or ratchet upon the wheel N, and the teeth upon the wheel P, is to afford means for intermittently locking these wheels, the two ratchets being arranged to co-operate with two detents or locking dogs, the one co-operating with the ratchet O and the other with the ratchet upon the wheel P. The arrangement and operation of these detents is such that when the detent for the wheel P is thrown into position to lock said wheel from movement the detent for the wheel N is thrown out of engagement with the ratchet O, and when the latter detent is engaged with the ratchet O to lock the wheel N the other detent is disengaged from the ratchet on the wheel P to release the latter, and to this end the two detents are preferably secured rigidly together and arranged to vibrate upon opposite sides of the same axis, as will be hereinafter described. The movements of these detents are controlled by the operating keys of the right hand set and the connections between the keys and the detents are such that the detents will be moved at different points in the uniform strokes of the keys, determined by the value of the key operated, and in this manner the wheel N will be released and the wheel P locked at the proper point in the movement of the driving gear E to effect the registration of the value of the operated key upon the wheel V.

The two detents co-operating with the wheels N and P are shown in Figs. 5 and 6, where it will be seen that they consist of two locking dogs W X fast upon the rock-shaft Z, Fig. 3, journaled at its opposite ends in brackets A' B' upon the framework. The detent W co-operates with the ratchet upon the wheel P, while the detent X co-operates with the ratchet O upon the wheel N, as seen in Fig. 5. The detent X is normally engaged with the ratchet O and the detent W held out of engagement with the ratchet of the wheel P by a spring C' connected at one end to an arm D' fast upon the shaft Z and at its other to the cross piece E' of the framework. When the shaft Z is rocked forward the detent X will be disengaged from the ratchet O, to release the wheel N, and the detent W simultaneously engaged with the ratchet of the wheel P, to lock the latter.

Hung upon the shaft Z above the rear ends of the right hand set of keys, Fig. 3, (at the left hand in said view) is a frame F' having nine pendent arms G', one extending downward in proximity to the rear end of each key lever. The lower end of each one of these pendent arms G' carries upon its side a stud or other projection H', which studs co-operate with graduated cams I' formed upon or secured to the sides of the key levers K near their rear ends, Figs. 3 and 4. A coiled spring J' surrounding the shaft Z, Fig. 3, and confined at one end in a collar K' fast upon said shaft and bearing at its opposite end against the cross bar of the frame F', Fig. 4, presses said frame rearward against a lug or projection L' upon the side of an arm M' fast upon the rock-shaft Z at the right hand side of the frame F' in Fig. 3. The pressure of the spring J' is not sufficient to overcome the resistance of the spring C', Fig. 5, which holds the rock-shaft Z in normal position as heretofore described. The frame F' is therefore capable of being vibrated forward and backward, in the former direction against the pressure of the spring J' and in the latter direction against the stress of the spring C' before described. When moved backward the engagement of its right hand side (Fig. 3) with the projection on the arm M' will cause the latter to rock the shaft Z forward and disengage the detent X from the ratchet O and engage the detent W with the ratchet of the wheel P, Fig. 5. When the front end of any key lever K is depressed and its rear end lifted the shoulder upon the rear side of the cam I' carried by said key, Fig. 4, will engage the stud or projection H' upon the side of the adjacent arm G' of the frame F' and force said arm and frame rearward, thereby rocking the shaft Z forward and engaging the detent W with the wheel P and disengaging the detent X from the ratchet O. The engagement of the rear side of the cam I', below its shoulder, with the stud upon the arm H' will hold the frame F' in its rearward position and the rock-shaft Z in its forward position until the lower end of the cam I' has passed above the stud H', which it does just at the completion of the stroke of the key. The spring C' thereupon throws the shaft Z back to normal position, disengaging the detent W from the wheel P and re-engaging the detent X with the ratchet O and causing the arm M' to carry the frame F' back to the position shown in Fig. 4. When the operated key is released and its rear end descends the lower rounded end of the cam I' presses upon the upper rear side of the stud H' and forces the arm G' and frame F' forward, against the pressure of the spring J', and the cam passes downward behind the stud H'. When the upper end of the cam has cleared the stud the spring J' throws the frame F' rearward to normal position again. In this manner at each operation of any one of the key levers the shaft Z is rocked forward at some point in the downward or positive stroke of the key, said point being determined by the position of the cam shoulder upon the key, and the detent W engaged with the wheel P and the detent X disengaged from the ratchet O, and at the end of such stroke of the operated key the shaft Z is released and the spring C' throws it backward to normal position again, disengaging the detent W from the wheel P and re-engaging detent X with the ratchet O. The shoulders upon the rear sides of the cams I' are located at different distances from the studs H' upon the arms G' of the frame F', as shown in Fig. 3, where it will be seen that the shoulder upon the extreme left hand key in said view is located at the extreme lower end of its cam I', while the shoulder upon the next cam to the right is located at a greater distance from the lower end of the cam and nearer its co-operating stud H'. The shoulders upon the succeeding cams to the right are arranged in gradually increasing proximity to their co-operating studs H', that upon the extreme right hand key in the set in said view being located near the upper end of its cam and in close proximity to its co-operating stud H'. Owing to this arrangement of the cam shoulders relatively to the studs H' the frame F' will be thrown rearward and the rock-shaft Z forward at different points in the operations of the different keys in the set. Thus the one-cent key, upon the extreme left in Fig. 3, will nearly complete its downward stroke before its shoulder will move the frame F' and rock-shaft Z, while the cam shoulder upon the nine-cent key will rock said frame and shaft near the beginning of its stroke, the exact adjustment of the parts being such that the cam upon the nine-cent key will rock the frame F' and shaft Z, to release the wheel N and lock the wheel P, when said key has moved one unit of distance, the eight-cent key when it has moved two units of distance, the seven-cent key when it has moved three units of distance, and so on downward to the one-cent key, which will not operate the parts to effect the release of the wheel N and locking of the wheel P until said key has moved nine units of distance. From this description it will be understood that inasmuch as the full downward stroke of an operated key produces and corresponds to the full forward movement of the driving gear E, and inasmuch as the wheel N is normally locked and the wheel P normally free, the shifting of the detents W X at different points by the operations of different keys in the set will cause the driving gear in each instance to turn forward the wheel N the exact distance necessary to cause the value of the operated key to be registered upon the wheel V. Thus when the nine-cent key is depressed the wheel N will be released and the wheel P locked as soon as said key and driving gear E have moved one unit of distance, so that during their movement through the remaining nine units of distance the wheel N will be carried forward nine points and 9 be added upon the wheel V. At the end of the positive stroke of the key and forward movement of the driving gear the detents will be shifted again and the wheel N locked and the wheel P released, so that during the return movement of the operated key and driving gear the wheel N and registering wheel V will remain stationary and the wheel P be turned forward. In the same manner when any other key in the set is operated the detents will be shifted, in the manner described, at the proper point to cause the further forward movement of the driving gear to turn the registering wheel the proper distance to register the value of the operated key.

From the explanation which was given in connection with Fig. 13 of the drawings it will be understood that the operation of the parts above described might be reversed. That is to say, the arrangement might be such that the wheel P would be normally locked by the detent W and the wheel N left free to turn, so that the latter would be advanced and the registration effected during the first part of the forward movement of the driver. In such case the order of the cams I' upon the respective keys would be reversed, the cam upon the one-cent key being arranged nearest its co-operating stud H' on the frame F', and the nine-cent key the farthest from its co-operating stud upon said frame, the result being that the detents would be shifted by the operation of any key as soon as said key had been depressed far enough and the driving gear E turned forward thereby sufficiently to cause the wheel N to register the value of the key, the wheel N then becoming locked and the wheel P turning rearward during the continued downward movement of the key and forward movement of the driver. Thus the detents would be shifted by the one-cent key as soon as said key had been depressed one unit of distance; by the two-cent key when it had been depressed two units of distance; and so on to the nine-cent key, which would not shift the detents, to arrest the wheel N and release the wheel P until the key had been depressed nine units of distance and the driver E turned forward far enough to advance the wheel N nine points. It will also be understood from the explanation given in connection with Fig. 13 of the drawings that the driving gears might be given a complete revolution at each operation of the machine, always in the same direction, instead of oscillating forward and back through a half revolution as they do in the particular machine which I have illustrated. Such change in the operation would involve no material changes in the general construction of the machine, it only being necessary that instead of the simple rack and pinion connection between the vibrating frame and the shaft F there be employed mechanism for converting the reciprocating movement of the frame into rotary movements of the shaft. There are many well known ways of doing this, and it has been common in cash registers to interpose such mechanism between a vibrating frame such as that shown in the present machine and a shaft such as F, for giving such shaft a complete revolution in one direction at each complete operation of one of the key levers. Assuming the shaft F and driving gears to be given a complete forward revolution at each operation of one of the key levers the result would be that the wheel P would be turned rearward until the co-operation of the cam I' upon the operated key with the frame F' caused the detents to be shifted and the wheel N released and the wheel P locked. The continued forward movement of the driving gear would then turn the wheel N forward until the operated key completed its downward stroke, whereupon the shifting of the detents back to normal position would again lock the wheel N and release the wheel P, whereupon the remaining forward movement of the driving gear would turn the wheel P rearward and the wheel N and registering wheel V would remain stationary. At the next operation of the machine the wheel P would continue to turn rearward until the detents were shifted to lock it and release the wheel N, whereupon the latter would be turned forward by the remainder of the stroke of the key far enough to register the value of the key upon the wheel V, and then the detents would be shifted back to normal position and the wheel N locked and the wheel P released again, as will be readily understood.

It is obvious that other means than the detents W X and ratchets upon the wheels N P may be employed for intermittently locking and releasing said wheels, and that even where detents co-operating with ratchets upon the wheels are employed the form and arrangement of such detents may be widely varied. It is also evident that other devices interposed between the operating keys and the detents, for shifting the latter at different points by the operations of different keys, may be employed in place of the devices which I have illustrated and described for that purpose, it only being necessary that some suitable mechanism be interposed between the keys and the detents or other arresting or locking devices for the wheels, for the purpose of locking one wheel and releasing the other at different points in the operations of different keys. Furthermore, it will be understood that while in the machine illustrated the motive power for the driving gears is taken from the operating keys, a machine might be organized in which a separate motor for giving the driving gears a definite movement at each operation of the machine could be employed.

The registering devices for the right hand or units set of keys having now been described in detail, those for the two other sets of keys may be briefly described as follows: Loose upon the shaft F immediately to the right of the driving gear E', Fig. 2, is a gear wheel N' similar to the wheel N, and having fast upon its right hand side a toothed ring or ratchet O' corresponding to the ratchet O on the wheel N. At the right of the wheel N' is a toothed wheel P' corresponding to the wheel P and having fast upon its left hand side a rack Q', with which rack and the driving gear E' meshes a pinion R' carried by the wheel N'. A pair of detents W' X', Fig. 7, corresponding to the detents W X and fast upon a rock-shaft Z', Fig. 3, mounted at one end in the bracket B' and at its opposite end in a bracket $B^2$ co-operate with the wheel P' and ratchet O' in the same manner that the detents W X co-operate with the wheel P and ratchet O. The shaft Z' has hung upon it a frame $F^2$ corresponding to the frame F' and having pendent arms $G^2$ provided with studs $H^2$ co-operating with cams $I^2$ upon the key levers K of the middle set. The shaft Z' has fast upon it an arm $M^2$ having a lateral projection $L^2$ against which the frame $F^2$ is pressed by a coiled spring $J^2$ corresponding to the spring J'. The rock-shaft Z' and detents W' X' are held in normal position by a coiled spring $C^2$, Fig. 7, connected at one end to a cross piece Y of the frame and at its other to an arm $D^2$ fast upon the shaft Z'. The co-operation of the parts in shifting the detents W' X' is the same as that described in connection with the first set of keys. The registering wheel driven by the wheel N', and upon which the values of the keys of the middle set are registered, will be hereinafter described.

The registering devices for the third or left hand set of keys consist of a gear wheel $N^2$ loose upon the shaft F at the left of the driving gear $E^2$ and provided with a ratchet $O^2$, a toothed wheel $P^2$ loose upon said shaft at the left of the wheel $N^2$ and provided with a circular rack $Q^2$ with which and the driving gear $E^2$ meshes the pinion $R^2$ carried by the wheel $N^2$. A detent $W^2$, Fig. 2, and a detent corresponding to the detents X X' but not shown, co-operate with the wheel $P^2$ and ratchet $O^2$ respectively. These detents are fast upon a rock-shaft $Z^2$ journaled at one end in the bracket $B^3$ and at its other in the side frame of the machine and held in normal position by a spring corresponding to the springs C' $C^2$ and connected to an arm $D^3$ fast upon the shaft. There is a frame $F^3$, corresponding to the frames F' $F^2$, hung upon the shaft $Z^2$ and pressed rearward by a spring $J^3$ against a lug $L^2$ upon an arm $M^2$ fast on the rock-shaft $Z^2$, and the pendent arms $G^3$ of the frame $F^3$ are provided with studs $H^3$ corresponding to those upon the arms of the other two frames and co-operating with cams $I^3$ upon the key levers K of the dollar set of keys; all in the manner described in connection with the first set of keys. The gear wheel N' meshes with a pinion S' fast upon a sleeve T' which is loose upon a shaft Y', Figs. $5^a$ and 7, mounted near its left hand end in a bracket U' and supported at its other end in the manner hereinafter described. The sleeve T' has fast upon or integral with its right hand end a beveled gear $K^3$ which meshes with a pinion $L^3$ carried by a wheel V' fast upon the shaft Y'. At the right hand side of the wheel V' the pinion $L^3$ meshes with a beveled gear $M^3$ normally maintained in fixed position and co-operating as a stationary rack with the pinion $L^3$.

The wheel V' constitutes the registering wheel for the middle set of keys, and inasmuch as it will be turned only a half revolution at each complete revolution of the pinion S' and sleeve T', owing to its connection with those parts by the gear $K^3$ and pinion $L^3$, I divide its periphery into twenty spaces, instead of ten, and provide it with two sets of numbers, each from 0 to 9 inclusive. Under this arrangement of the parts the forward movement of the gear wheel N' at the operation of any key in the middle set will cause the value of such key to be registered upon the wheel V'. A ratchet $N^3$ fast upon the sleeve T' and co-operating with a pawl $O^3$ prevents backward movement of the registering wheel. Likewise a ratchet $P^3$, fast upon the right hand end of the shaft T and co-operating with a pawl $Q^3$, not heretofore referred to, prevents backward movement of the primary registering wheel V.

As above stated the beveled gear or rack $M^3$ with which the pinion $L^3$ carried by the wheel V' meshes is normally held stationary, so that when the sleeve T' and beveled gear $K^3$ are turned in the direction of the arrow by the wheel N' at the operation of any key in the middle set the pinion $L^3$ travels over the gear $M^3$ as a fixed rack, causing the wheel V' to make a half revolution at every complete revolution of the sleeve T' and gear $K^3$. On the other hand, when the wheel N' is locked, as it normally is, the gear $K^3$ is held stationary, so that if the gear $M^3$ should at such time be turned rearward the pinion $L^3$ would travel upon the gear $K^3$ as a fixed rack and the wheel V' would be turned rearward by the gear $M^3$. Now, the gear $M^3$, while normally stationary as before stated, is loosely mounted upon the shaft Y', Fig. $5^a$, and, by the means to be described, is released and turned rearward a tenth of a revolution at each complete revolution of the primary registering wheel V, thereby turning the secondary registering wheel V' rearward one twentieth of a revolution and adding 1 upon it. The gear $M^3$ has fast upon its right hand side a disk $R^3$ which is provided upon its right hand side with ten equidistant radial notches, Figs. 1, 2, 3 and $3^a$. At the left of the disk $R^3$ is a cylindrical block or housing $S^3$ fast upon the shaft T, the right hand end of the shaft Y' being supported in the bore of this housing. Confined in this housing parallel with the shaft T is a sliding pawl $T^3$, Fig. $5^a$, normally pressed toward the right by a spring $U^3$, with its beveled right hand end projecting to the right of the housing $S^3$. The bracket U has upon its left hand side a beveled lug or cam $V^3$ which stands in the path of travel of the right hand end of the sliding pawl $T^3$. At each complete revolution of the registering wheel V and shaft T the beveled end of the pawl $T^3$ will ride over the cam $V^3$ and the pawl be forced to the left, engaging its left hand end with one of the notches in the disk $R^3$ and thereby coupling said disk and the gear $M^3$ to the shaft T and causing said disk and gear to be turned one-tenth of a revolution as the pawl rides over the cam $V^3$. As soon as the pawl clears the cam the spring $U^3$ throws the pawl to the right again and releases the disk $R^3$ and gear $M^3$, which come to rest, (or are arrested in the manner hereinafter described,) while the parts carried by the shaft move on alone. The disk $R^3$ and gear $M^3$ are normally locked from movement by a sliding rod $W^3$, Figs. 1, 3 and $5^a$, confined in a housing $X^3$ carried by the bracket U upon the framework. This rod $W^3$ is normally held in its left hand locking position by a disk $Y^3$ fast upon the shaft T. The right hand end of the rod $W^3$ abuts against the left side of this disk, so that normally the rod cannot be moved to the right and its left hand end is held in positive engagement with one of the notches in the disk $R^3$. The left hand side of the disk $Y^3$, however, is provided with a notch $Z^3$, Fig. 3, and the adjustment of the parts is such that this notch comes opposite the rod $W^3$ at the same time that the sliding pawl $T^3$ engages the cam $V^3$ to be thrown into engagement with a notch at the upper side of the disk $R^3$, and the result is that at the moment the pawl $T^3$ is riding over the cam $V^3$ the rod $W^3$ is free to move to the right, into the notch in the disk $Y^3$. As the pawl $T^3$ passes over the cam $V^3$ and turns the disk $R^3$ and gear $M^3$ the left hand end of the sliding rod $W^3$ will be forced out of the notch in the disk $R^3$ with which it had been engaged and the rod slid to the right, but the adjustment is such that at the moment the pawl $T^3$ clears the cam $V^3$ the notch $Z^3$ in the disk $Y^3$ is carried beyond the rod and the beveled side of said notch forces the rod to the left and engages its left hand end with the next notch in the disk $R^3$, the rod being then positively held in this locking position by the flush surface of the left side of the disk $Y^3$ until said disk completes another revolution and brings its notch $Z^3$ opposite the rod again. In this manner at each complete revolution of the primary registering wheel V the secondary registering wheel V' is advanced one number to register the revolution of the primary wheel.

The wheel $N^2$, which co-operates with the left hand set of keys, meshes with a pinion $A^4$ fast upon a shaft $B^4$, journaled at its left hand end in the side frame of the machine and near its right hand end in a bracket $C^4$. At the right of the bracket $C^4$ the shaft $B^4$ has fast upon it a beveled gear $D^4$, which meshes with a pinion $E^4$ mounted in a wheel $F^4$ loose upon the shaft $B^4$. At its right hand side the pinion $E^4$ meshes with a beveled gear $G^4$ loose upon the shaft $B^4$ and having fast upon its right side a disk $H^4$ corresponding to the disk $R^3$ before described but provided with twenty notches in its right hand face. The gear $G^4$ and disk $H^4$ are normally locked by a sliding rod $H^6$, Fig. 3, corresponding to the rod $W^3$ and co-operating with a disk $I^4$ corresponding to the disk $Y^3$ but provided with two diametrically opposite notches such as $Z^3$. The gear $G^4$ therefore normally co-operates as a fixed rack with the pinion $E^4$, so that as the shaft $B^4$ and gear $D^4$ are turned in the direction of the arrow by the wheel $N^2$, at each operation of a key in the left hand set, the gear $D^4$ will carry the wheel $F^4$ with it, the latter turning a half revolution for each complete revolution of the gear $D^4$. The wheel $F^4$ meshes with a pinion $J^4$, Fig. 7, fast upon a sleeve $K^4$ loose upon a shaft $L^4$, and the sleeve $K^4$ has fast upon it a toothed wheel $M^4$ meshing with a second toothed wheel $N^4$ which in turn meshes with a similar toothed wheel $O^4$, Figs. 1 and 2, fast upon the right hand side of the primary wheel of a set of four registering wheels $P^4$, $Q^4$, $R^4$ and $S^4$, mounted in a frame $T^4$ secured upon the framework, and adapted to register units, tens, hundreds and thousands of dollars, respectively, the wheel $P^4$ transferring its registrations to the wheel $Q^4$, the wheel $Q^4$ to the wheel $R^4$, and the wheel $R^4$ to the wheel $S^4$, in the usual manner. The adjustment of the gearing interposed between the wheel $N^3$ and dollar registering wheel $P^4$ is such that at each operation of any key in the left hand set the wheel $P^4$ will be turned just far enough by the movement of the wheel $N^4$ to register the value of the operated key.

The transfer from the secondary registering wheel $V'$ to the dollar registering wheel $P^4$ at each half revolution of the wheel $V'$ is effected in a similar manner and by similar means as in the case of the transfer from the primary registering wheel $V$ to the secondary wheel $V'$, before described. The shaft $Y'$ extends through and projects at the left hand side of the bracket $U'$ and has fast upon it at the left of said bracket a cylindrical housing $U^4$ similar to the housing $S^3$ before described, and this housing carries a sliding pawl $V^4$ which co-operates with two diametrically opposite cams $W^4$ and the notches in the disk $H^4$ to turn the gear $G^4$ one twentieth of a revolution at each half revolution of the shaft $Y'$ and registering wheel $V'$. This twentieth of a revolution of the gear $G^4$ will turn the wheel $F^4$ one fortieth of a revolution, and the gearing between the wheel $F^4$ and the dollar registering wheel $P^4$ is such that this fortieth of a revolution of the wheel $F^4$ will turn the wheel $P^4$ one tenth of a revolution and add one dollar upon it. The gear-wheel $N^2$ has the same number of teeth as the wheels $N$ and $N'$, but the pinion $A^4$ is twice the size of the pinions $S$ and $S'$, so that the operation of any key in the left hand set will cause the wheel $N^2$ to turn the wheel $F^4$ only one fortieth of a revolution for each unit of value of the key, instead of a twentieth of a revolution, as in the case of the wheel $V'$, or a tenth of a revolution, as in the case of the primary wheel $V$. It will be seen that I utilize in these transfer devices a mechanical movement similar to that which I employ in the primary registering devices, and it may be explained that these transfer devices always effect the proper transfers no matter whether a key in only one set, or keys in two sets or three sets be operated simultaneously, and without regard to the position in which the registering wheels have been left by the preceding operation of the machine.

One of the difficulties heretofore experienced with many machines designed to add into one common total the registrations of keys in different sets has been that when keys in two sets were operated simultaneously and the registering wheels happened to be standing in position for a transfer to be effected from one wheel to the other the transfer was liable to be lost, since the secondary wheel would be turning under the impulse of an operated key at the same moment that the transfer devices were actuated to move it to effect the transfer from the primary wheel. Taking the transfer devices between the wheels $V$ and $V'$ in my machine, and referring to Fig. 2, it will be remembered that when the gear $K^3$ is held stationary and the gear $M^3$ turned to effect the transfer the wheel $V'$ will be turned only half as far as the gear $M^3$ turns, advancing a twentieth of a revolution for each tenth of a revolution of the gear $M^3$. This is owing to the fact that the pinion $S^3$ carried by the wheel $V'$ travels upon the gear $K^3$ as a fixed rack. It will now be readily seen that if at the moment the gear $M^3$ is moving to effect the transfer the gear $K^3$ is turning in the same direction at the same speed the pinion $L^3$ will not be revolved on its own axis during the time both gears are moving in unison but will be carried bodily rearward between the two gears, so that the wheel $V'$, during the time the two gears are moving together, will turn the same distance as the gears. Now, the two gears move together while the gear $M^3$ is moving its tenth of a revolution, to effect the transfer, so that during this time the registering wheel $V'$ is advanced two numbers, instead of one, as would have been the case had the gear $M^3$ been stationary. Thus, if, with the wheel $V$ standing at "8" and the wheel $V'$ at "0" the seventy-cent key and the five-cent key be simultaneously depressed, the operation of the seventy-cent key will cause the wheel $N'$, to turn the gear $K^3$ fourteen-twentieths of a revolution, which movement of the gear $K^3$ would ordinarily turn the wheel $V'$ seven-twentieths of a revolution and register seven upon it, but the simultaneous operation of the five-cent key will cause the gear $M^3$ to be turned rearward with the gear $K^3$ during two-twentieths of its revolution, at some point in its movement, and during such movement of the two gears together the wheel $V'$ will be advanced two-twentieths of a revolution, instead of one-twentieth, as would have been the case if the gear $M^3$ had remained stationary, and thus the wheel $V'$ will be advanced eight numbers, instead of seven, thus effecting the proper transfer and causing "3" to be exposed at the registering point on the wheel $V$. In the same manner if a key in the middle set and one in the left hand set be simultaneously depressed when the registering wheel V' is standing in such position that the operation of the key in the middle set will carry it past the transfer point the movement of the gears D⁴ G⁴ will cause the dollar registering wheel P⁴ to be advanced one number farther than it would have been turned by the movement of the gear D⁴ alone so that the value of the operated key in the left hand bank and the transfer from the wheel V' will both be added upon the wheel P⁴.

While I utilize in these transfer devices a mechanical movement similar to that interposed between the several sets of operating keys and their respective registering wheels, it will be understood that the employment of such mechanical movement in the transfer devices is wholly independent of its employment elsewhere, and that my novel transfer mechanism may be employed to advantage in machines where widely different forms of mechanism are interposed between the operating keys and registering wheels for actuating the latter. Thus, so far as the transfer devices between the primary wheel V and secondary wheel V' in the present machine are concerned, it is wholly immaterial what means is employed to actuate either the primary wheel or the driving gear K³ of the secondary wheel. It is likewise immaterial what sort of devices are interposed between the primary wheel and the gear M³ for giving the latter its intermittent movements. The four elements, consisting of the gears K³, M³, wheel V' and pinion L³, may therefore be employed to advantage, and to accomplish the same result, in any sort of registering machine where the gear K³ may be given different degrees of movement by the different keys of one set and the gear M³ actuated intermittently during the revolutions of the primary wheel under the operations of the keys of the other set. The shaft B⁴ has fast upon it near its left hand end a ratchet X⁴ with which co-operates a spring-pressed pawl Y⁴, to prevent backward movement of the shaft B⁴ and parts carried by and geared to it.

The remaining feature of my invention relates to means for compelling full strokes of the operated keys, and incidentally to a novel mechanical movement for converting reciprocating into rotary motion, as is illustrated more particularly in Figs. 4, 8, 9, 10, 11, 14 and 15. As seen in Fig. 4 the operating keys K are provided upon their upper sides near their rear ends with slotted lugs or hooks Z⁴ adapted to co-operate with the rearwardly projecting flange of the cross bar J of the vibrating frame, as is common in machines of this class. When the front end of any key lever is depressed the rear end becomes hooked upon the cross bar J and remains coupled to it during the further operation of the key, so that if means be applied to the vibrating frame or crossbar J to compel a definite movement of said frame it will also compel a definite movement of the operated key.

Pivoted at its lower end to an arm A⁵ projecting upward from the vibrating frame at its right hand end, Figs. 4, 8, 9 and 11, is a bar B⁵ provided in its upper half with a middle longitudinal slot or opening C⁵ open at its upper end and forming two opposing arms D⁵ E⁵ which embrace a sleeve F⁵ loose upon the shaft F heretofore described. The opposite walls of the slot C⁵ bearing against the opposite sides of the sleeve F⁵ form a guide for the bar B⁵ when it is reciprocated by the movements of the vibrating frame. Immediately at the left of the point at which the sleeve F⁵ is engaged by the walls of the slot C⁵ (or the smooth inner sides of the arms D⁵ E⁵ formed by said slot), the sleeve has secured to or formed upon it a segment of a pinion G⁵, Figs. 10 and 11, adapted to co-operate with two racks H⁵ I⁵ upon the inner faces of the arms D⁵, E⁵, Figs. 14 and 15. If the teeth of this segment be engaged with the rack I⁵ at the beginning of an operation of the machine the lifting of the vibrating frame by the depression of the front end of the operated key will cause the rack I⁵ to turn the segment and sleeve F⁵ in the direction of the arrow, and if at the completion of the downward stroke of the operated key and upward movement of the rack I⁵ the segment G⁵ be disengaged from the rack I⁵ and engaged with the rack H⁵ then the downward movement of the parts upon the return of the key to normal position will cause the rack H⁵ to turn the segment and sleeve onward in the direction of the arrow and complete the revolution of them. The segment G⁵, however, cannot be alternately disengaged from one rack and engaged with the other simply by the operation of the racks themselves, and the novelty of this feature of my invention consists in the provision of auxiliary means for moving the segment, after it has been moved by one of the racks, to engage it with, or bring it into position to be engaged by, the other rack. When the operated key has been given its full downward stroke and the rack I⁵ has turned the segment and sleeve in the direction of the arrow as far as it is capable of turning them, the auxiliary means which I have provided moves the segment forward slightly, independently of both racks, into position to be engaged by the rack H⁵ and carried on around by the downward movement of said rack. Likewise at the end of the downward movement of the racks, or at the very beginning of their upward movement, after the segment has been carried as far as the downward movement of the rack H⁵ can turn it the auxiliary means referred to moves it forward into position to be engaged and turned onward by the upward movement of the rack I⁵. The means which I have provided for this purpose may be described as follows: Loose upon the sleeve F⁵, immediately at the left of the segment G⁵, Figs. 9 and 10, is a pinion J⁵ adapted to co-operate with racks K⁵ L⁵ located upon the inner faces of the arms D⁵ E⁵ at opposite ends thereof, Figs.

14 and 15, the rack $L^5$ being a comparatively short one and the rack $K^5$ a long one. The pinion $J^5$ has fast upon its left hand side, Figs. 4 and 10, a disk or pawl-carrier $M^5$ which has pivoted to its left hand side a pawl $N^5$ spring-pressed against the surface of a collar $M^6$ fast upon the extreme left hand end of the sleeve $F^5$, which collar is provided with two diametrically opposite beveled projections or teeth $O^5$, Fig. 4 adapted to co-operate with the pawl $N^5$. Referring now to Fig. 9 it will be seen that upon the first upward movement of the rack-bar the engagement of the rack $L^5$ with the pinion $J^5$ will turn said pinion and the disk $M^5$, Fig. 4, forward in the direction of the arrow, and as the pawl $N^5$ is in engagement with one of the projections $O^5$ upon the sleeve $F^5$, the latter and the segment $G^5$, Fig. 11, will be carried forward with the pinion $J^5$ and disk $M^5$, carrying the segment $G^5$ into engagement with the rack $I^5$, whereupon in the continued upward movement of the racks the engagement of the rack $I^5$ with the segment $G^5$ will carry the sleeve $F^5$ on forward. The rack $L^5$ is of such limited length that it clears the pinion $J^5$ in the upward movement of the parts soon after it has turned said pinion and disk $M^5$ far enough to carry the segment $G^5$ into engagement with the rack $I^5$ in the manner above described, so that the pinion $J^5$ and disk $M^5$ are released and left free to turn upon the sleeve $F^5$ in the opposite direction. The rack $K^5$ upon the opposite arm $D^5$ thereupon comes into engagement with the pinion $J^5$ and turns the pinion and disk $M^5$ in the opposite direction, the beveled sides of the projections $O^5$ permitting them and the pawl $N^5$ to slip past each other. The rack $K^5$ remains in engagement with the pinion $J^5$ after its upward movement is completed, and its upward movement turns the pinion $J^5$ and disk $M^5$ backward just far enough to cause the pawl $N^5$ to catch over the projection $O^5$ opposite the one with which it had been previously engaged, so that at the completion of the upward movement of the parts the pawl is engaged with one of the projections $O^5$ just as shown in Fig. 4. When the operated key is now released and the vibrating frame and racks moved downward the engagement of the rack $K^5$ with the pinion $J^5$ will turn said pinion forward (in the direction of the arrow) and the engagement of the pawl $N^5$ with the projection $O^5$ upon the sleeve $T^5$ will carry the segment $G^5$ on forward into engagement with the rack $H^5$, whereupon during the further downward movement of the racks the rack $H^5$ will turn the sleeve $F^5$ on forward. The rack $K^5$ clears the pinion $J^5$ when the parts have been returned about half way to normal position so that the pinion is then left free to turn in the reverse direction and it is thereupon engaged by the rack $L^5$ and turned backward to the normal position from which it started, the pawl $N^5$ being brought into engagement with the abrupt face of the projection $O^5$ with which it was originally engaged, as seen in Fig. 4. At the next operation of the machine and upward movement of the racks the rack $L^5$ will first turn the pinion $J^5$ slightly forward and cause the segment $G^5$ to be carried into engagement with the rack $I^5$; thereupon the rack $I^5$ will turn the sleeve $F^5$ forward during the continued upward movement of the racks, while the rack $K^5$ will engage the pinion $J^5$ and turn it and the pawl in the reverse direction; at the beginning of the downward movement of the racks the rack $K^5$ will turn the pinion $J^5$ and disk $M^5$ forward again and the pawl will carry the sleeve $F^5$ and segment $G^5$ with it, bringing the segment into engagement with the rack $H^5$; during the continued downward movement of the racks the sleeve $F^5$ will be turned on forward by the engagement of the rack $H^5$ with the segment $G^5$, the rack $K^5$ clearing the pinion $J^5$ and the rack $L^5$ re-engaging said pinion and turning it and the disk $M^5$ and pawl in the reverse direction to normal position again; all as will be readily understood. In this manner at each complete operation of any one of the keys and consequent upward and downward movement of the vibrating frame and racks the sleeve $F^5$ will be turned one complete revolution in the direction of the arrow. Said sleeve has fast upon its right hand end a ratchet $P^5$ with which co-operates a pawl $Q^5$ to prevent backward movement of the ratchet and sleeve. This ratchet and pawl prevent any reverse movement of the racks and vibrating frame until given their full movement in the direction in which they started, and as the operated key is coupled to the vibrating frame in the manner above described it is compelled to make a full movement in each direction.

I am aware that it is not broadly new in a cash register to couple the operating keys to a vibrating frame and convert the reciprocating movements of said frame into rotary motion in a shaft or sleeve and apply a ratchet and pawl to said shaft, for the purpose of compelling full strokes of the operating keys in each direction. On the other hand my novel mechanism for converting reciprocating motion into rotary motion may be employed for other purposes, without the ratchet and pawl and independently of the vibrating frame or other parts of a cash register.

The indicating mechanism of the machine may be of any usual or suitable manner. In the drawings I have shown it as consisting of the usual numbered tablets $A^6$ carried upon the upper ends of vertically guided tablet rods $B^6$, which rest at their lower ends upon the rear ends of the key levers and are provided with collars or projections $C^6$ which co-operate with a pivoted supporting bar or wing $D^6$ in the usual well known manner. There is also combined with each of the three sets of operating keys a series of stops, of any of the usual forms, for preventing the simultaneous operation of two keys in the same set, but permitting the simultaneous operation of two or more keys in different sets.

I am aware that a mechanical movement consisting simply of two gear wheels, such as A and C, and an intermediate wheel, such as B, carrying a pinion, as D, meshing with the gears A and C, is old and well known, and has been employed in registering and analogous machines; but while I employ the above elements in my invention I believe that the combination of parts and the mode of operation of them hereinbefore described and hereinafter set forth in my claims are broadly new.

Having thus fully described my invention, I claim—

1. In a mechanical movement for registering machines, the combination of a driving member, a driven member, a revoluble member, a fourth member carried by the revoluble member in driving connection with the driving and driven members, and means co-operating with the revoluble and driven members to arrest one and release the other at different points in the movement of the driving member, for the purpose of imparting different portions of the movement of the latter to the revoluble member, substantially as described.

2. In a mechanical movement for registering machines, the combination of a driving member, a driven member, a revoluble member, a fourth member carried by the revoluble member and geared to the driving and driven members, and means co-operating with the revoluble and driven members to arrest one and release the other at different points in the movement of the driving member, for the purpose of imparting different portions of the movement of the latter to the revoluble member, substantially as described.

3. In a mechanical movement for registering machines, the combination of a driving wheel, a driven wheel, a revoluble wheel, a pinion carried by the revoluble wheel and geared to the driving and driven wheels, and means co-operating with the revoluble and driven wheels to arrest one and release the other at different points in the movement of the driving wheel, for the purpose of imparting different portions of the movement of the latter to the revoluble wheel, substantially as described.

4. In a mechanical movement for registering machines, the combination of a driving gear, a driven gear, a revoluble wheel, a pinion carried by said wheel and meshing with the two gears, a pair of detents co-operating with the driven gear and revoluble wheel, to alternately lock and release said gear and wheel, and means for shifting the detents at different points in the movement of the driving gear, substantially as described.

5. In a mechanical movement for registering machines, the combination of a driving gear, a driven gear, an interposed revoluble wheel, a pinion mounted in said wheel and meshing with the two gears, and means for alternately locking and releasing the driven gear and revoluble wheel at different points in the movement of the driving gear, substantially as described.

6. In a mechanical movement for registering machines, the combination of a driving gear, a driven gear, an interposed revoluble wheel, a pinion mounted in said wheel and meshing with the two gears, a pair of detents co-operating with the driven gear and revoluble wheel, to alternately lock one and release the other, and means for shifting the detents at different points in the movement of the driving gear, substantially as described.

7. In a registering machine, the combination of a series of operating keys representing different amounts, a driving member, a driven member, a revoluble member, a fourth member carried by said revoluble member in driving connection with the driving and driven members, and means actuated by the operating keys for locking and releasing the driven member and revoluble member at points in the movement of the driving member determined by the particular key operated, substantially as described.

8. In a registering machine, the combination of a series of operating keys representing different amounts, a driving member, a driven member, a revoluble member, a pinion carried by the revoluble member and geared to the driving and driven members, and means actuated by the operating keys for locking and releasing the driven member and revoluble member at points in the movement of the driving member determined by the particular key operated, substantially as described.

9. In a registering machine, the combination of a series of operating keys representing different amounts, a driving gear, a driven gear, an interposed revoluble wheel, a pinion mounted in said wheel and meshing with the two gears, and means actuated by the operating keys for locking and releasing the driven gear and revoluble wheel at points in the movement of the driving gear determined by the particular key operated, substantially as described.

10. In a registering machine, the combination of a series of operating keys representing different amounts, a driving gear given a definite movement by the operation of each key, a driven gear, an interposed revoluble wheel, a pinion mounted in said wheel and meshing with the two gears, and means actuated by the operating keys to lock and release the revoluble wheel and driven gear at points in the movement of the driving gear determined by the particular key operated, substantially as described.

11. In a registering machine, the combination of a series of keys representing different amounts, a driving gear given a definite movement by the operations of different keys, a driven gear, a revoluble wheel, a pinion carried by said wheel and meshing with the two gears, a pair of detents co-operating with the driven gear and revoluble wheel, to alternately lock and release said gear and wheel, and means intermediate said detents and the operating keys for shifting said detents at points in the movement of the driving gear determined by the particular key operated, substantially as described.

12. In a registering machine, the combination of a series of operating keys representing different amounts, a driving gear given a definite movement by the operations of different keys, a driven gear, an interposed revoluble wheel, a pinion mounted in said wheel and meshing with the two gears, a pair of detents co-operating with the driven gear and revoluble wheel, to alternately lock and release said gear and wheel, and means intermediate said detents and the operating keys for shifting said detents at points in the movement of the driving gear determined by the particular key operated, substantially as described.

13. In a registering machine, the combination of a series of operating keys representing different amounts, an oscillatory driving gear given a definite movement forward and backward by the operations of different keys, a driven gear, an interposed revoluble wheel, a pinion mounted in said wheel and meshing with the two gears, and means actuated by the operating keys to lock and release the driving gear and revoluble wheel at points in the movement of the driving gear determined by the particular key operated, substantially as described.

14. In a registering machine, the combination of a series of operating keys representing different amounts, a movable frame common to all of the keys and given a definite movement by the operations of different keys, an oscillatory driving gear, a rack and pinion connection between said gear and movable frame, for oscillating the gear forward and backward at the operation of each key, a driven gear, a revoluble wheel interposed between the driving and the driven gears, a pinion mounted in said wheel and meshing with the two gears, a pair of detents co-operating with the driven gear and revoluble wheel, for alternately locking and releasing said gear and wheel, and means intermediate said detents and the operating keys for shifting the detents at different points in the movements of the keys determined by the particular key operated, substantially as described.

15. In a registering machine, the combination of a series of operating keys representing different amounts, a driving gear having a definite movement at each operation of the machine, a driven gear, a revoluble wheel, a pinion carried by said wheel and meshing with the two gears, a pair of locking dogs or detents vibrating together upon opposite sides of the same axis and co-operating with the revoluble wheel and driven gear, to alternately lock one and release the other, and means intermediate said detents and the operating keys for vibrating the detents at different points in the movement of the driving gear, substantially as described.

16. In a registering machine, the combination of a series of operating keys representing different amounts, a driving gear having a definite movement at each operation of the machine, a driven gear, an interposed revoluble wheel, a pinion mounted in said wheel and meshing with the two gears, a pair of locking dogs or detents vibrating together upon opposite sides of the same axis and co-operating with the revoluble wheel and driven gear, to alternately lock one and release the other, and means intermediate said detents and the operating keys for vibrating the detents at different points in the movement of the driving gear, substantially as described.

17. In a registering machine, the combination of a series of operating keys representing different amounts, a driving gear having a definite movement at each operation of the machine, a driven gear, an interposed revoluble wheel, a pinion mounted in said wheel and meshing with the two gears, a pair of detents co-operating with said wheel and driven gear, to alternately lock one and release the other, and a movable frame for shifting the detents, co-operating with a series of graduated cams upon the operating keys to shift the detents at different points in the movement of the driving gear, substantially as described.

18. In a registering machine, the combination of two or more sets of operating keys, the keys of each set representing different amounts, a vibrating frame common to all of the keys and given a definite movement by the operation of each key, a shaft, and connections between said shaft and vibrating frame for giving the shaft a definite movement at the operation of each key, two or more driving gears fast upon said shaft, one for each set of operating keys, two or more driven gears loose upon said shaft, one adjacent each driving gear, two or more revoluble wheels, one adjacent each pair of driving and driven gears and carrying a pinion meshing with said gears, and means intermediate each set of operating keys and its co-operating gears and revoluble wheel for alternately locking and releasing the revoluble wheel and driven gear at different points in the movement of the driving gear determined by the particular key operated, substantially as described.

19. In a registering machine, the combination of two or more sets of operating keys, the keys of each set representing different amounts, a vibrating frame common to all of the keys and moved by the operation of each key, a rock-shaft, a pinion fast thereon, a rack actuated by the movements of the vibrating frame and meshing with said pinion, two or more driving gears fast upon the rock-shaft, one for each set of operating keys, two or more driven gears loose upon said shaft, one adjacent each driving gear, two or more revoluble wheels, one adjacent each pair of driving and driven gears and carrying a pinion meshing with said gears, and means intermediate each set of operating keys and its co-operating gears and revoluble wheel for alternately locking the revoluble wheel and driven gear at different points in the movement of the driving gear determined by the particular key operated, substantially as described.

20. In a registering machine, the combination of two or more sets of operating keys, the keys of each set representing different amounts, a vibrating frame common to all of the keys and moved by the operation of each key, a shaft, and connections between said shaft and vibrating frame for giving the shaft a definite movement at the operation of each key, two or more driving gears fast upon said shaft, one for each set of operating keys, two or more driven gears loose upon said shaft $m$, one adjacent each driving gear, two or more revoluble wheels, one adjacent each pair of driving and driven gears and carrying a pinion meshing with said gears, two or more pairs of detents, one pair for each driven gear and revoluble wheel and co-operating therewith to alternately lock one and release the other, and means intermediate each set of operating keys and the corresponding pair of detents, for shifting the latter at different points in the movement of the driving gear determined by the particular key operated, substantially as described.

21. In a registering machine, the combination of two or more sets of operating keys, the keys of each set representing different amounts, a vibrating frame common to all of the keys and moved by the operation of each key, a shaft, and connections between said shaft and vibrating frame for giving the shaft a definite movement at the operation of each key, two or more driving gears fast upon said shaft, one for each set of operating keys, two or more driven gears loose upon said shaft, one adjacent each driving gear, two or more revoluble wheels loose upon said shaft, one adjacent each pair of driving and driven gears and carrying a pinion meshing with said gears, two or more pairs of detents, one pair for each revoluble wheel and driven gear, the detents of each pair vibrating together upon opposite sides of the same axis and co-operating with the revoluble wheel and driven gear to alternately lock one and release the other, two or more movable frames for vibrating the respective pairs of detents, and a series of graduated cams upon the keys of each set, co-operating with said movable frames to shift the detents at different points in the movement of the driving gear determined by the particular key operated, substantially as described.

22. In a transfer mechanism for registering machines employing two sets of operating keys actuating respectively a primary and a secondary registering wheel in any suitable manner, the combination of a driving gear for the secondary wheel, a second gear normally disconnected from the primary wheel but intermittently actuated in any suitable manner at predetermined intervals in the revolutions of said wheel, the secondary registering wheel, and a pinion carried by said wheel in driving connection with the two gears, substantially as and for the purpose described.

23. In a transfer mechanism for registering machines, the combination of the secondary registering wheel $V'$, the driving gear $K^3$ therefor actuated in any suitable manner by one set of keys, the gear $M^3$ located upon the opposite side of the wheel $V'$ and normally disconnected from the primary registering wheel, but intermittently actuated in any suitable way at predetermined intervals in the revolutions of said wheel, and the pinion $L^3$ mounted in the wheel $V'$ and meshing with the gears $K^3$ $M^3$, substantially as and for the purpose described.

24. In a transfer mechanism for registering machines, the combination of the secondary registering wheel $V'$, the driving gear $K^3$ therefor actuated by one set of keys, the gear $M^3$, the pinion $L^3$ carried by the wheel $V'$ and meshing with the gears $K^3$ $M^3$, the notched disk $R^3$ turning with the gear $M^3$, the housing $S^3$ turning with the primary registering wheel, the cam $V^3$, and the sliding pawl $T^3$ confined in the housing $S^3$ and co-operating with the cam $V^3$ and notched disk $R^3$, substantially as described.

25. In a transfer mechanism for registering machines, the combination of the secondary registering wheel $V'$, the driving gear $K^3$ therefor actuated by one set of keys, the gear $M^3$, the pinion $L^3$ carried by the wheel $V^3$ and meshing with the gears $K^3$ $M^3$, the notched disk $R^3$ turning with the gear $M^3$, the housing $S^3$ turning with the primary registering wheel, the cam $V^3$, the sliding pawl $T^3$ confined in the housing $S^3$ and co-operating with the cam $V^3$ and notched disk $R^3$, the locking disk $Y^3$ turning with the primary registering wheel and housing $S^3$ and provided with the notch $Z^3$, and the locking rod $W^3$ co-operating with the disk $Y^3$ and with the notches in the disk $R^3$, substantially as described.

26. In a transfer mechanism for registering machines, the combination of the revoluble notched disk $R^3$, the fixed cam $V^3$, a pawl-support or housing, as $S^3$, interposed between the cam $V^3$ and disk $R^3$, the sliding pawl $T^3$ carried in the housing $S^3$ and co-operating with the cam $V^3$ and disk $R^3$, the locking disk $Y^3$ turning with the housing $S^3$ and provided with the notch $Z^3$, and the locking rod $W^3$ co-operating with the disks $Y^3$ and $R^3$, substantially as described.

27. In a mechanical movement for registering machines and the like, the combination of a toothed segment fast upon a revoluble support, as a shaft or sleeve, two parallel racks reciprocating upon opposite sides of the segment and adapted to alternately engage it, a pinion loose upon the segment-support, two auxiliary racks co-operating with said pinion, and a connection between the pinion and the segment-support for moving the latter at the ends of the opposite strokes of the first mentioned racks, for the purpose of carrying the segment into engagement with one rack after it has been disengaed from the other, substantially as described.

28. The combination of the revoluble segment $G^5$ fast upon a suitable support, as the sleeve $F^5$, the pinion $J^5$ loose upon said support, the pawl $N^5$ carried by the pinion $J^5$ and co-operating with projections upon the segment-support, the reciprocating racks $H^5$ $I^5$ co-operating with the segment $G^5$, and the auxiliary racks $K^5$ $L^5$ co-operating with the pinion $J^5$, substantially as and for the purpose described.

29. In a registering machine, the combination of a series of operating keys, a movable bar or frame common to and moved by the keys and to which each key becomes attached when displaced from normal position, a toothed segment fast upon a revoluble support, as a shaft or sleeve, a ratchet also fast upon said support and a pawl co-operating with the ratchet to prevent reverse movement of the segment, two parallel racks carried by the movable bar or frame and reciprocating upon opposite sides of the segment and adapted to alternately engage it, a pinion loose upon the segment support, two auxiliary racks co-operating with said pinion, and a connection between the pinion and the segment-support for moving the latter at the ends of the opposite stroke of the first-mentioned racks, for the purpose of carrying the segment into engagement with one rack after it has been disengaged from the other, substantially as and for the purpose described.

HUGO COOK.

Witnesses:
F. A. L. SNECKNER,
WILLIAM B. SULLIVAN.